US011248734B2

(12) United States Patent
Allard et al.

(10) Patent No.: US 11,248,734 B2
(45) Date of Patent: Feb. 15, 2022

(54) STRUCTURAL CABINET FOR AN APPLIANCE INCORPORATING UNITARY METALLIC BOXES

(71) Applicant: WHIRLPOOL CORPORATION, Benton Harbor, MI (US)

(72) Inventors: Paul B. Allard, Coloma, MI (US); Mohamed Alshourbagy, Stevensville, MI (US); Lakshya J. Deka, Mishawaka, IN (US); Eric J. Dherde, St. Joseph, MI (US); Gustavo Frattini, St. Joseph, MI (US); Alberto R. Gomes, St. Joseph, MI (US); Lynne F. Hunter, Dorr, MI (US); Giulia Marinello, St. Joseph, MI (US); Abhay Naik, Stevensville, MI (US); Sanjesh Kumar Pathak, Stevensville, MI (US); Jerry M. Visin, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/064,853

(22) Filed: Oct. 7, 2020

(65) Prior Publication Data

US 2021/0025539 A1  Jan. 28, 2021

Related U.S. Application Data

(63) Continuation of application No. 16/309,320, filed as application No. PCT/US2016/056389 on Oct. 11, 2016, now Pat. No. 10,830,384.

(51) Int. Cl.
*F16L 59/065* (2006.01)
*F25D 23/06* (2006.01)
(Continued)

(52) U.S. Cl.
CPC .......... *F16L 59/065* (2013.01); *F25D 23/062* (2013.01); *F25D 23/087* (2013.01);
(Continued)

(58) Field of Classification Search
CPC .... F16L 59/065; F25D 23/062; F25D 23/087; F25D 23/006; F25D 2201/14; F25D 2323/021; F25D 2400/40
See application file for complete search history.

(56) References Cited

U.S. PATENT DOCUMENTS

| 1,561,769 A | 11/1925 | Ballew |
| 2,515,212 A | 7/1950 | Giffard |

(Continued)

FOREIGN PATENT DOCUMENTS

| JP | 2014126224 | 7/2014 |
| JP | 2016142437 | 8/2016 |

(Continued)

*Primary Examiner* — Hanh V Tran
(74) *Attorney, Agent, or Firm* — Price Heneveld LLP

(57) ABSTRACT

An appliance includes a metallic outer wrapper having sidewalls, a wrapper backwall and a machine wall. At least one metallic inner liner has liner walls and a liner backwall, wherein the metallic outer wrapper and the at least one metallic inner liner are coupled together at a trim breaker to define a structural cabinet having a hermetically sealed interior cavity defined between the metallic outer wrapper and the at least one metallic inner liner. The trim breaker defines a front face of the structural cabinet. At least one trim breaker conduit extends through the wrapper and liner backwalls wherein the trim breaker conduit defines a conduit through the structural cabinet, and wherein the structural cabinet is hermetically sealed at the trim breaker conduit.

17 Claims, 12 Drawing Sheets

(51) Int. Cl.
*F25D 23/08* (2006.01)
*F25D 23/00* (2006.01)

(52) U.S. Cl.
CPC ........ *F25D 23/006* (2013.01); *F25D 2201/14* (2013.01); *F25D 2323/021* (2013.01); *F25D 2400/40* (2013.01)

(56) References Cited

U.S. PATENT DOCUMENTS

| | | | | |
|---|---|---|---|---|
| 3,167,931 | A * | 2/1965 | Bryson | F25D 17/047 62/277 |
| 3,572,049 | A * | 3/1971 | Moorman | F25D 27/00 62/132 |
| 4,180,297 | A * | 12/1979 | Abrams | F25D 23/065 16/2.2 |
| 4,186,945 | A * | 2/1980 | Hahn | F16L 5/022 174/153 G |
| 4,805,293 | A * | 2/1989 | Buchser | F25D 23/064 264/46.6 |
| 5,271,240 | A * | 12/1993 | Detrick | F25D 17/042 62/268 |
| 5,586,680 | A | 12/1996 | Dellby et al. | |
| 6,224,179 | B1 * | 5/2001 | Wenning | F25D 23/065 312/406 |
| 6,408,841 | B1 | 6/2002 | Hirath et al. | |
| 6,485,122 | B2 | 11/2002 | Wolf et al. | |
| 6,725,624 | B2 | 4/2004 | Hirath et al. | |
| 7,107,780 | B2 * | 9/2006 | Bellini | F25D 17/047 137/533.27 |
| 7,641,298 | B2 * | 1/2010 | Hirath | F25D 23/065 312/401 |
| 7,762,634 | B2 * | 7/2010 | Tenra | B32B 3/04 312/5 |
| 8,857,931 | B2 | 10/2014 | Jung et al. | |
| 9,170,046 | B2 | 10/2015 | Jung et al. | |
| 9,228,775 | B2 | 1/2016 | Jung et al. | |
| 9,752,818 | B2 * | 9/2017 | Naik | F25D 23/061 |
| 10,274,247 | B2 | 4/2019 | Jeong et al. | |
| 10,584,914 | B2 * | 3/2020 | Jung | F25D 23/06 |
| 10,767,919 | B2 * | 9/2020 | Naik | F25D 23/065 |
| 10,837,696 | B2 * | 11/2020 | Jung | F16L 59/065 |
| 2003/0008100 | A1 | 1/2003 | Horn | |
| 2004/0104654 | A1 * | 6/2004 | Lee | F25D 23/10 312/401 |
| 2005/0235682 | A1 * | 10/2005 | Hirai | F25D 23/062 62/440 |
| 2006/0082073 | A1 | 4/2006 | Dorner et al. | |
| 2008/0110128 | A1 | 5/2008 | Hirath et al. | |
| 2009/0084123 | A1 | 4/2009 | Hayase | |
| 2009/0241585 | A1 * | 10/2009 | Diebold | F25D 17/047 62/406 |
| 2009/0324871 | A1 * | 12/2009 | Henn | E04B 1/803 428/69 |
| 2011/0023532 | A1 | 2/2011 | Kobayashi et al. | |
| 2012/0104923 | A1 | 5/2012 | Jung et al. | |
| 2013/0105495 | A1 * | 5/2013 | Jung | F25D 23/062 220/592.05 |
| 2013/0256319 | A1 * | 10/2013 | Kuehl | F25B 39/00 220/592.09 |
| 2013/0257256 | A1 * | 10/2013 | Allard | B23P 15/26 312/406 |
| 2013/0257257 | A1 * | 10/2013 | Cur | B29C 65/002 312/406.1 |
| 2014/0346942 | A1 * | 11/2014 | Kim | F25D 23/064 312/404 |
| 2015/0076984 | A1 | 3/2015 | Jung et al. | |
| 2015/0137674 | A1 | 5/2015 | Choi et al. | |
| 2015/0153097 | A1 | 6/2015 | Koo et al. | |
| 2016/0047593 | A1 | 2/2016 | Jung et al. | |
| 2017/0138656 | A1 * | 5/2017 | Pfeiffer | F25D 23/068 |
| 2018/0017314 | A1 | 1/2018 | Jeong et al. | |
| 2018/0356147 | A1 | 12/2018 | Jung et al. | |
| 2019/0178562 | A1 | 6/2019 | Naik | |
| 2020/0033049 | A1 | 1/2020 | Dherde et al. | |

FOREIGN PATENT DOCUMENTS

| | | |
|---|---|---|
| SU | 1730514 | 4/1992 |
| WO | 9920961 | 4/1999 |
| WO | 0049352 | 8/2000 |
| WO | 0107848 | 2/2001 |
| WO | 0139570 | 6/2001 |
| WO | 2006045694 | 5/2006 |
| WO | 2016141021 | 9/2016 |

* cited by examiner

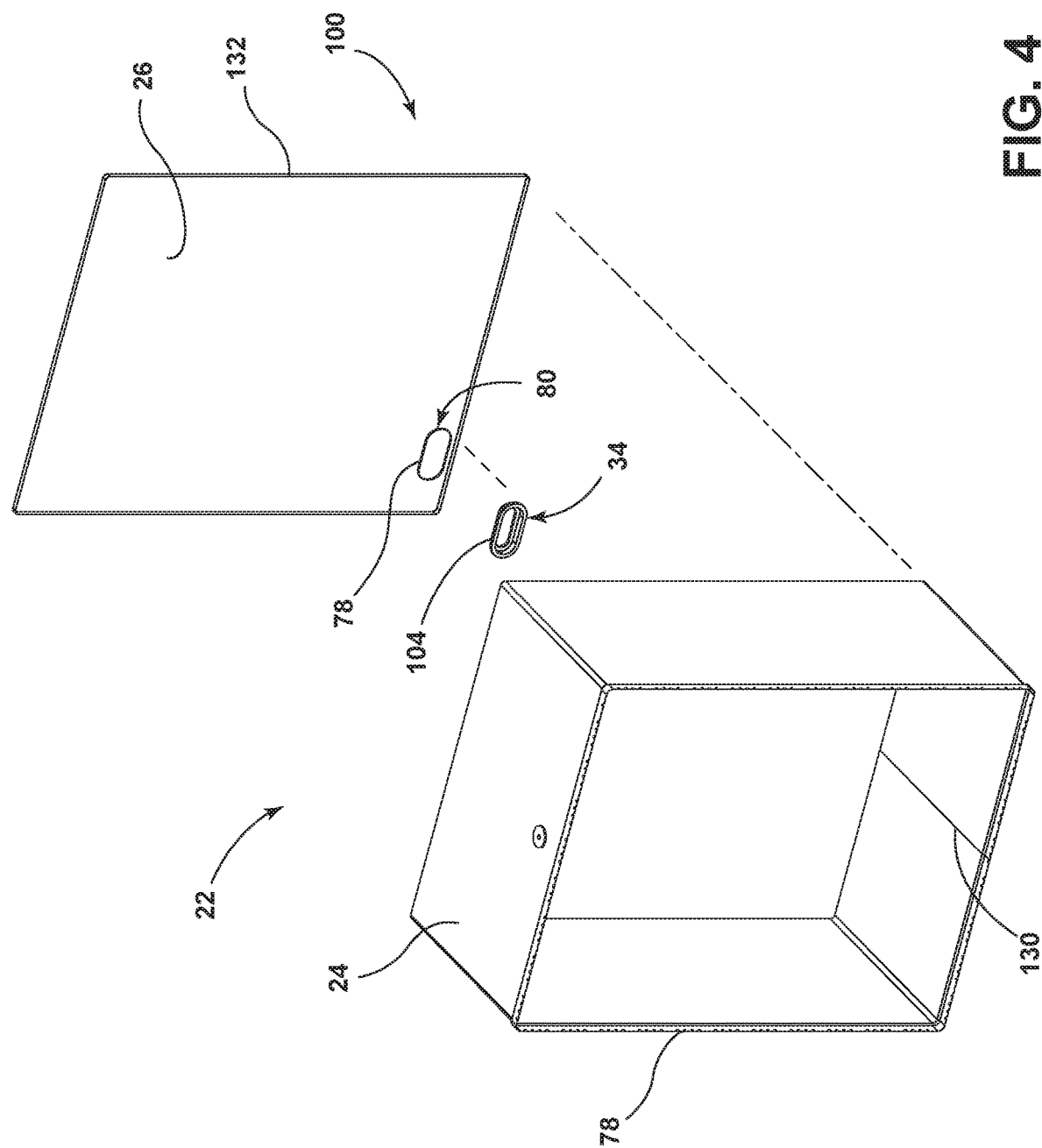

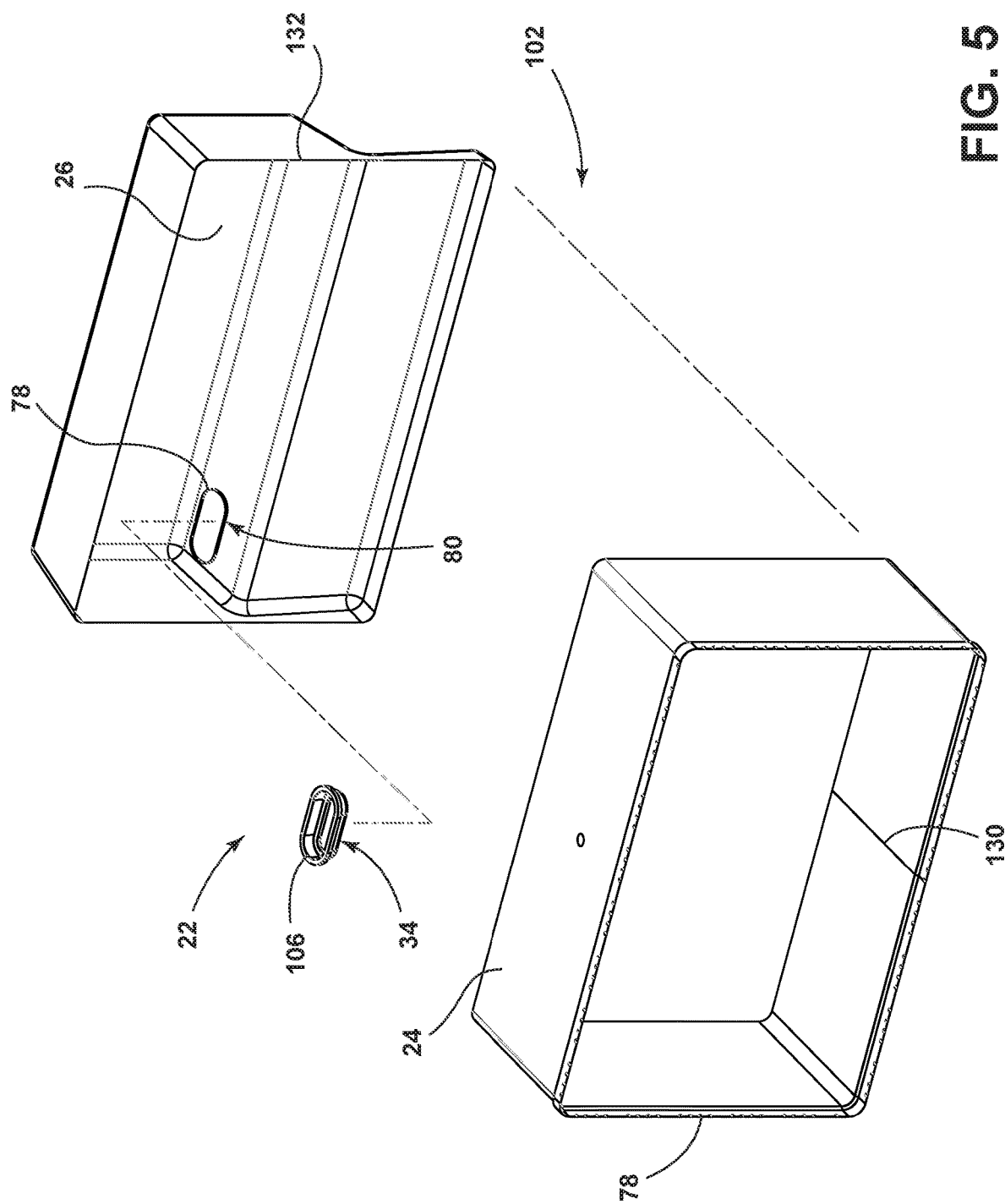

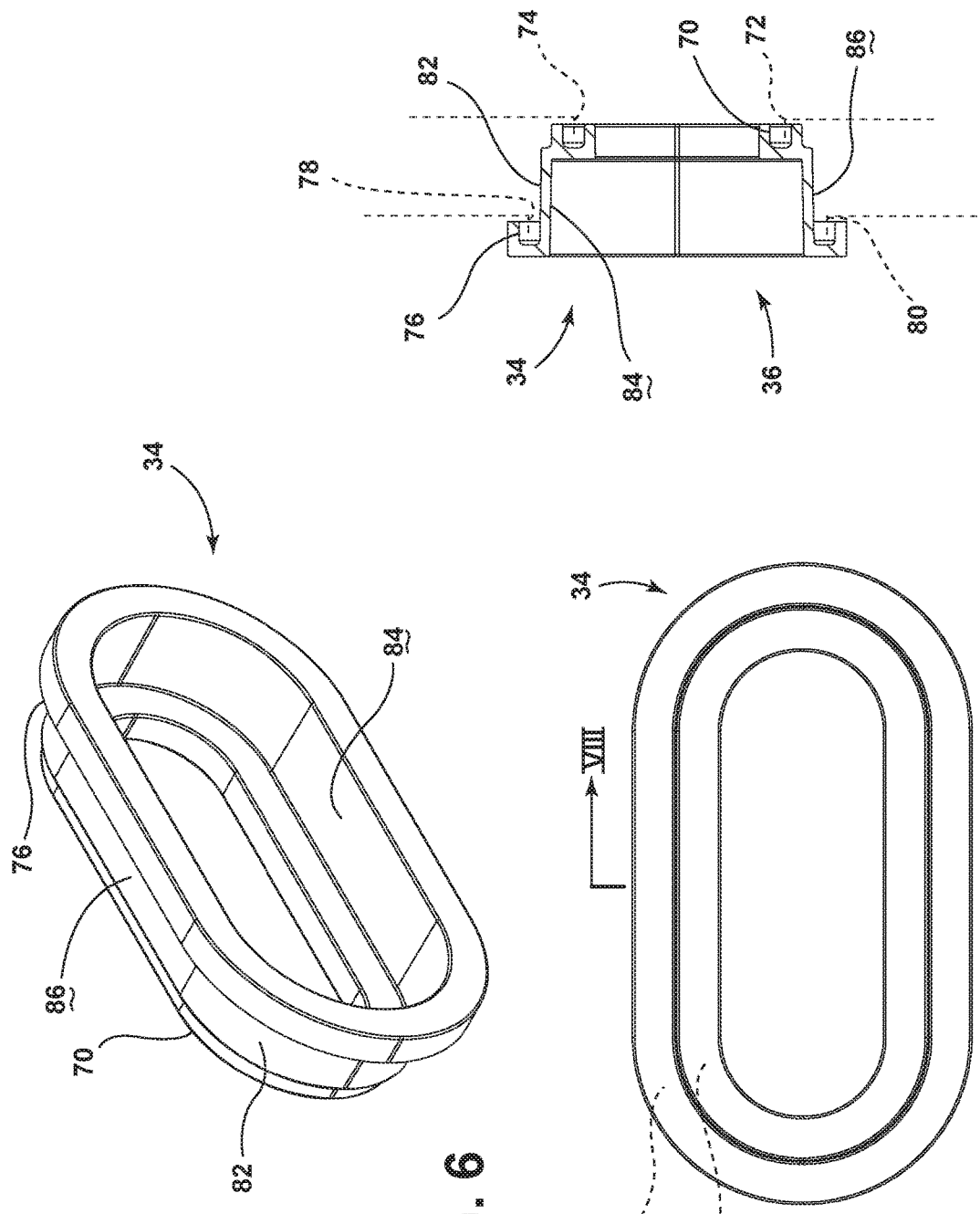

STRUCTURAL CABINET FOR AN APPLIANCE INCORPORATING UNITARY METALLIC BOXES

CROSS-REFERENCE TO RELATED APPLICATIONS

The present application is a continuation of U.S. patent application Ser. No. 16/309,320 filed Dec. 12, 2018, entitled STRUCTURAL CABINET FOR AN APPLIANCE INCORPORATING UNITARY METALLIC BOXES, which is a national stage of International Application No. PCT/US2016/056389 filed Oct. 11, 2016, entitled STRUCTURAL CABINET FOR AN APPLIANCE INCORPORATING UNITARY METALLIC BOXES, the entire disclosures of which are hereby incorporated herein by reference.

FIELD OF THE DEVICE

The device is in the field of refrigerating appliances, and more specifically, a refrigerating appliance incorporating a welded metallic outer wrapper and welded metallic inner liners for forming a unitary structural cabinet.

SUMMARY

In at least one aspect, an appliance includes a metallic outer wrapper having sidewalls, a wrapper backwall and a machine wall. At least one metallic inner liner has liner walls and a liner backwall, wherein the metallic outer wrapper and the at least one metallic inner liner are coupled together at a trim breaker to define a structural cabinet having a hermetically sealed interior cavity defined between the metallic outer wrapper and the at least one metallic inner liner. The trim breaker defines a front face of the structural cabinet. At least one trim breaker conduit extends through the wrapper and liner backwalls wherein the trim breaker conduit defines a conduit through the structural cabinet, and wherein the structural cabinet is hermetically sealed at the trim breaker conduit.

In at least another aspect, an appliance includes a metallic outer wrapper having sidewalls, a wrapper backwall and a machine wall, at least one metallic inner liner having liner walls and a liner backwall, wherein the metallic outer wrapper and the at least one metallic inner liner are coupled together at a trim breaker to define a structural cabinet having a hermetically sealed interior cavity defined between the metallic outer wrapper and the at least one metallic inner liner. The trim breaker defines a front face of the structural cabinet. A cavity partition is disposed within the interior cavity, the cavity partition separating the interior cavity into separate and distinct first and second portions of the interior cavity.

In at least another aspect, a method of forming an appliance cabinet includes welding sidewalls, a wrapper backwall and a machine wall together to define a metallic outer wrapper, wherein a wrapper conduit aperture is defined within the metallic outer wrapper. The method also includes welding liner sidewalls and a liner backwall together to define a metallic inner liner, wherein a liner conduit aperture is defined within the metallic inner liner. The method also includes disposing the metallic inner liner into the metallic outer wrapper and aligning the wrapper conduit aperture with the liner conduit aperture. The method also includes attaching a trim breaker to a liner edge of the inner liner and a wrapper edge of the outer wrapper to define a structural cabinet with an interior cavity defined between the inner liner and the outer wrapper. The method also includes attaching a trim breaker conduit to the wrapper and liner conduit apertures to define a conduit extending through the structural cabinet. The method also includes expressing gas from the interior cavity, wherein an at least partial vacuum is defined therein.

In at least another aspect, a method of forming an appliance cabinet includes welding sidewalls, a wrapper backwall and a machine wall together to define a metallic outer wrapper. The method also includes welding liner sidewalls and a liner backwall together to define a metallic inner liner. The method also includes disposing the metallic inner liner into the metallic outer wrapper and disposing a cavity partition between the inner liner and the outer wrapper. The method also includes attaching a trim breaker to a liner edge of the inner liner and a wrapper edge of the outer wrapper to define a structural cabinet with an interior cavity defined between the inner liner and the outer wrapper, wherein the cavity partition separates the interior cavity into first and second portions of the interior cavity. The method also includes expressing gas from the first portion of the interior cavity and expressing gas from the second portion of the interior cavity.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 4 is an exploded perspective view of an inner liner for a refrigerating compartment of the structural cabinet of FIG. 2;

FIG. 5 is an exploded perspective view of the inner liner for a freezing compartment of the structural cabinet of FIG. 2;

FIG. 6 is a perspective view of a trim breaker conduit for forming a conduit through the structural cabinet of FIG. 2;

FIG. 7 is a front elevational view of the trim breaker conduit of FIG. 6;

FIG. 8 is a cross-sectional view of the trim breaker conduit of FIG. 7 taken along line VIII-VIII;

DETAILED DESCRIPTION OF EMBODIMENTS

Figure 1:
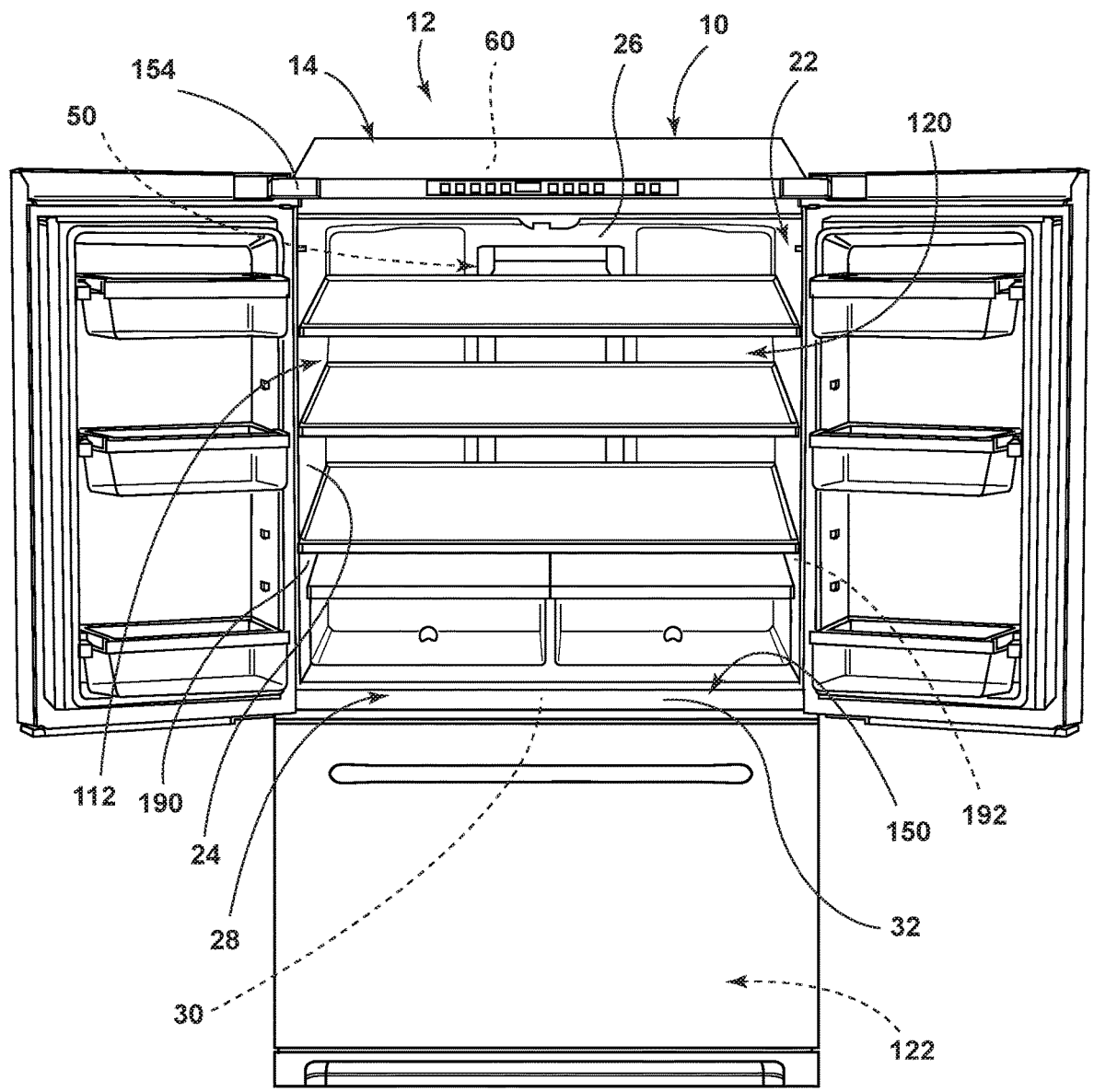
FIG. 1 is a front perspective view of a structural cabinet for an appliance showing door panels in an open position to view a refrigerating compartment.
Figure 2:
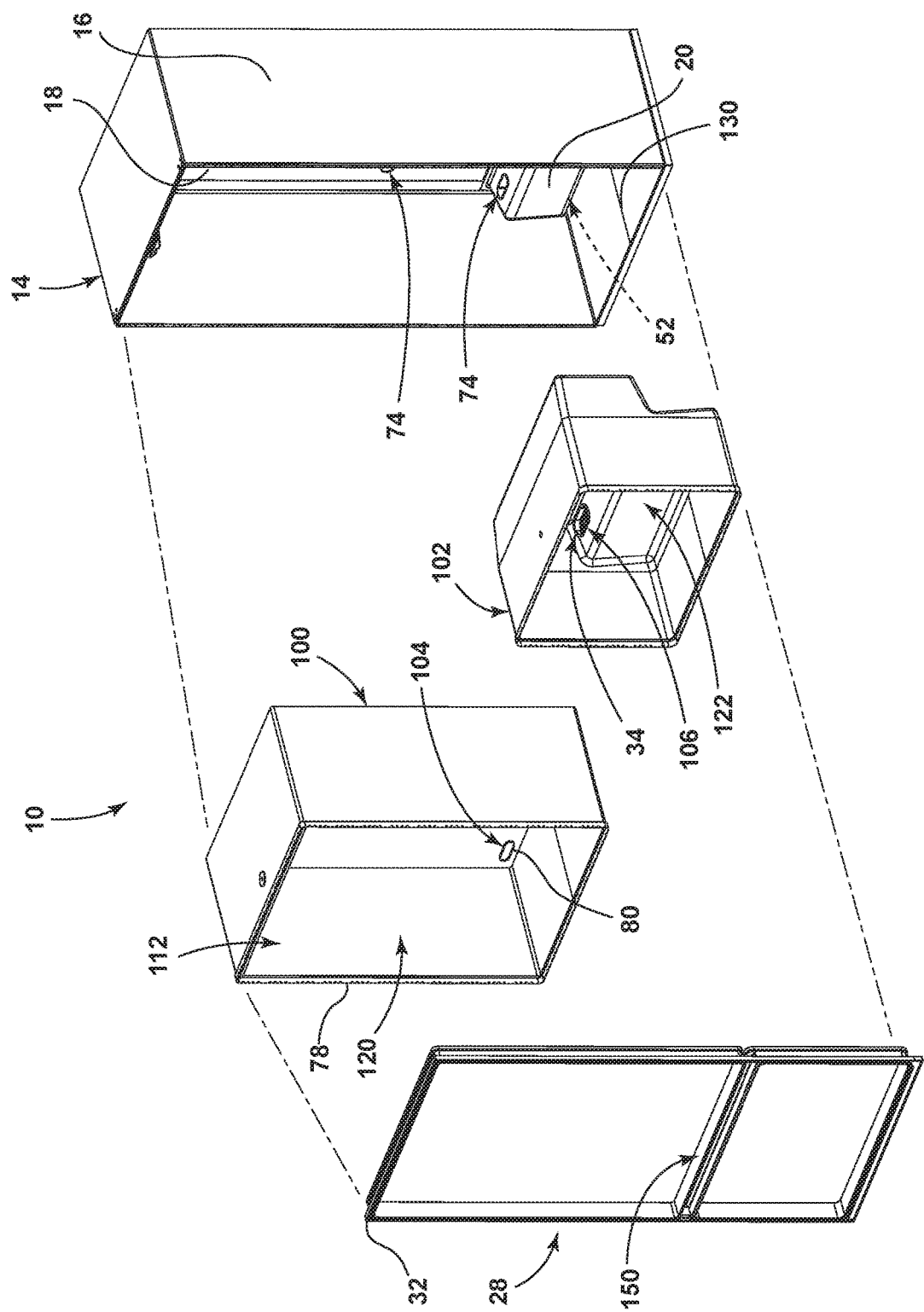
FIG. 2 is an exploded perspective view of an aspect of a structural cabinet for an appliance.
Figure 3:
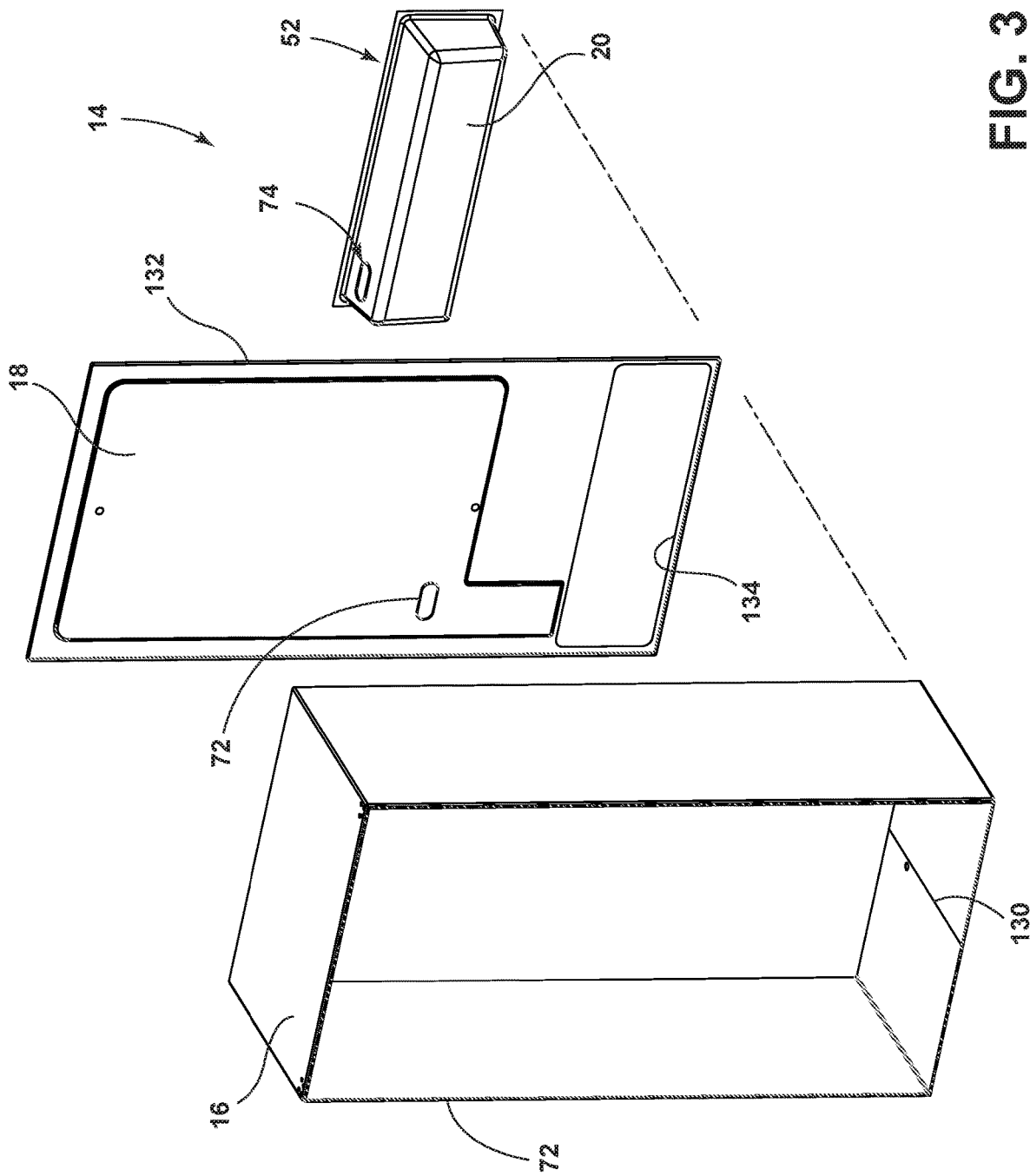
FIG. 3 is an exploded perspective view of an outer wrapper for the structural cabinet of FIG. 2.
Figure 9:
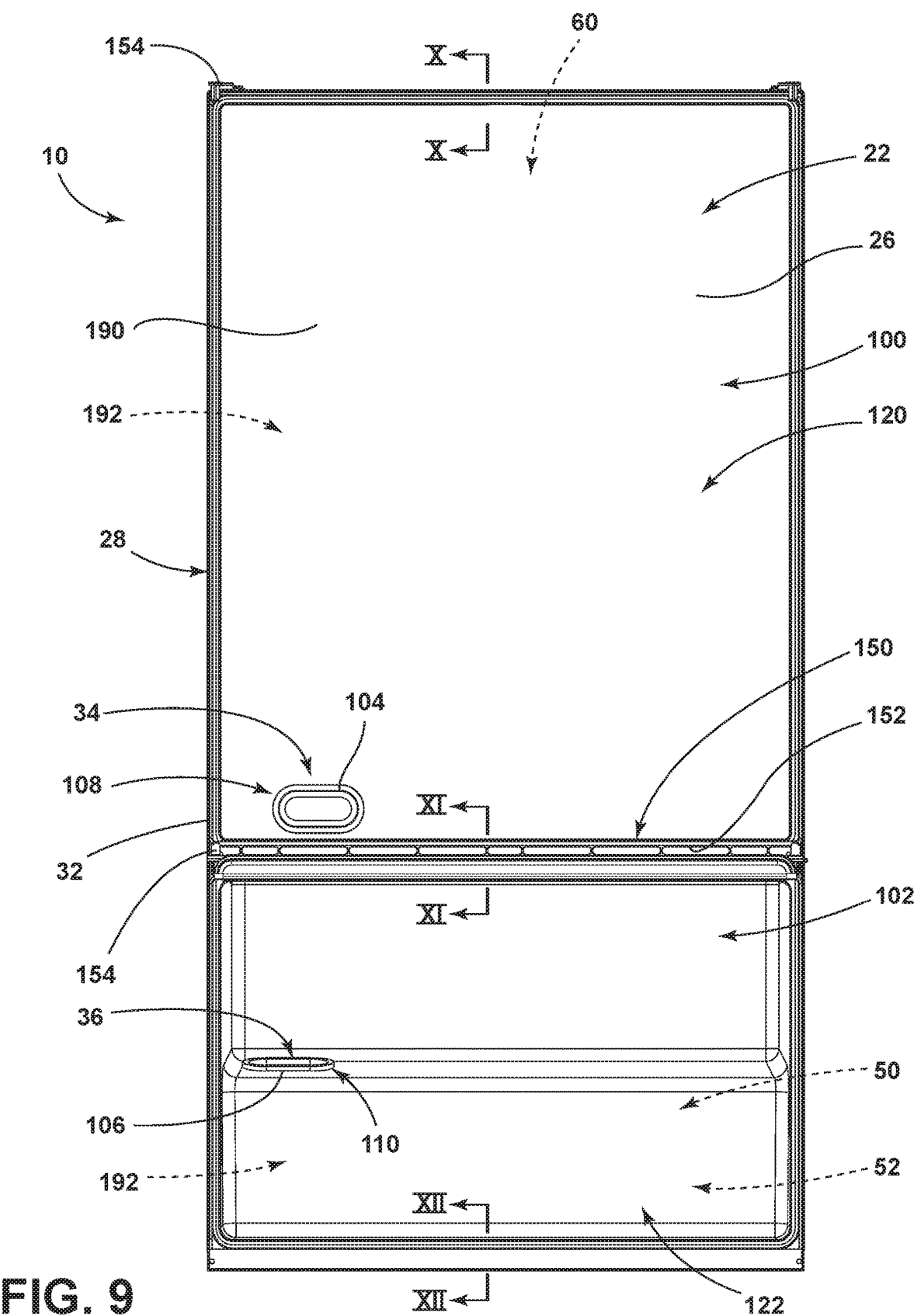
FIG. 9 is a front elevational view of the structural cabinet of FIG. 2.
Figure 10:
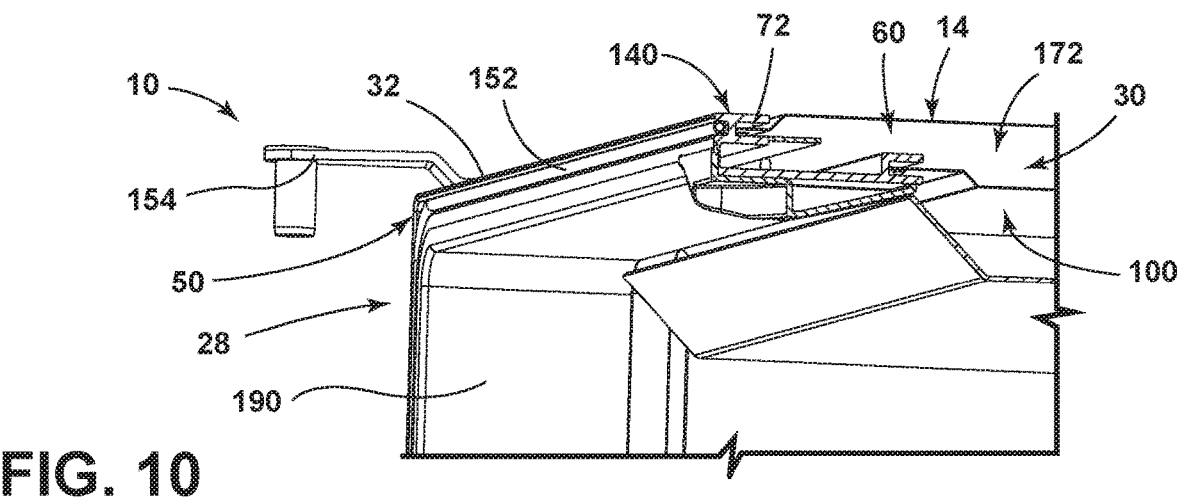
FIG. 10 is a perspective cross-sectional view of the structural cabinet of FIG. 9, taken along line X-X.
Figure 11:
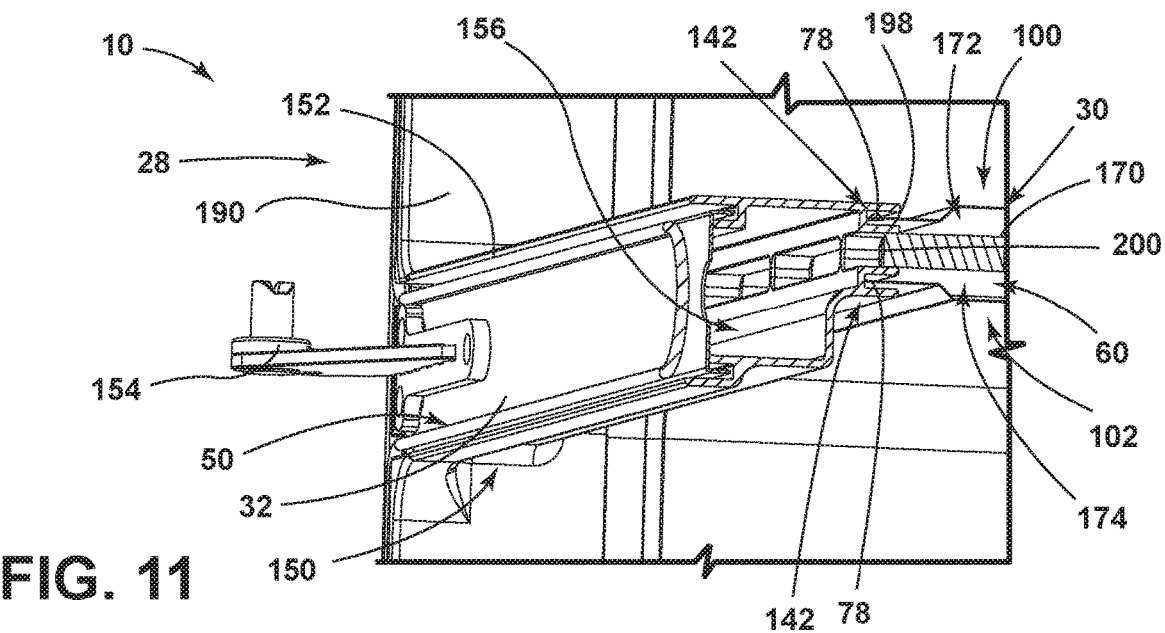
FIG. 11 is a perspective cross-sectional view of the structural cabinet of FIG. 9, taken along line XI-XI.
Figure 12:
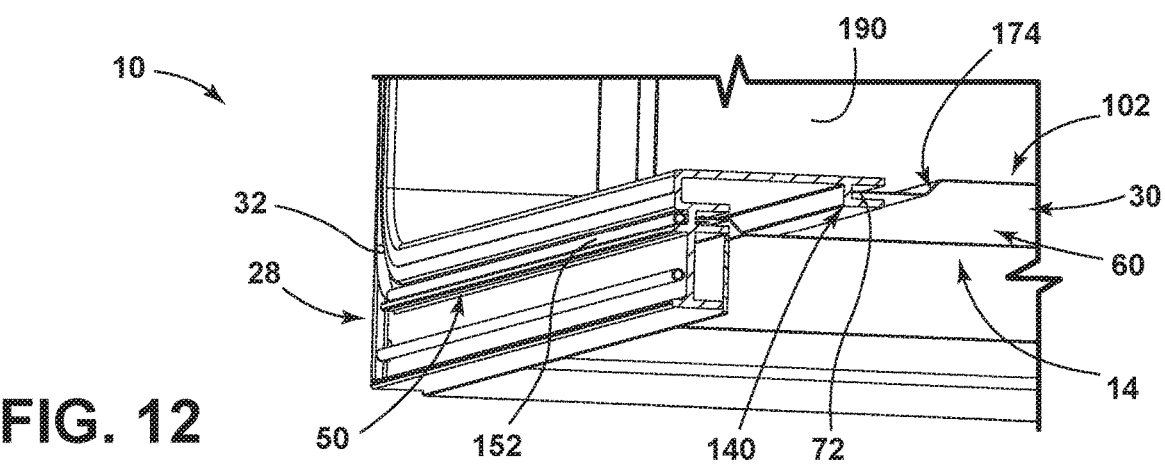
FIG. 12 is a perspective cross-sectional view of the structural cabinet of FIG. 9, taken along line XII-XII.
Figure 14:
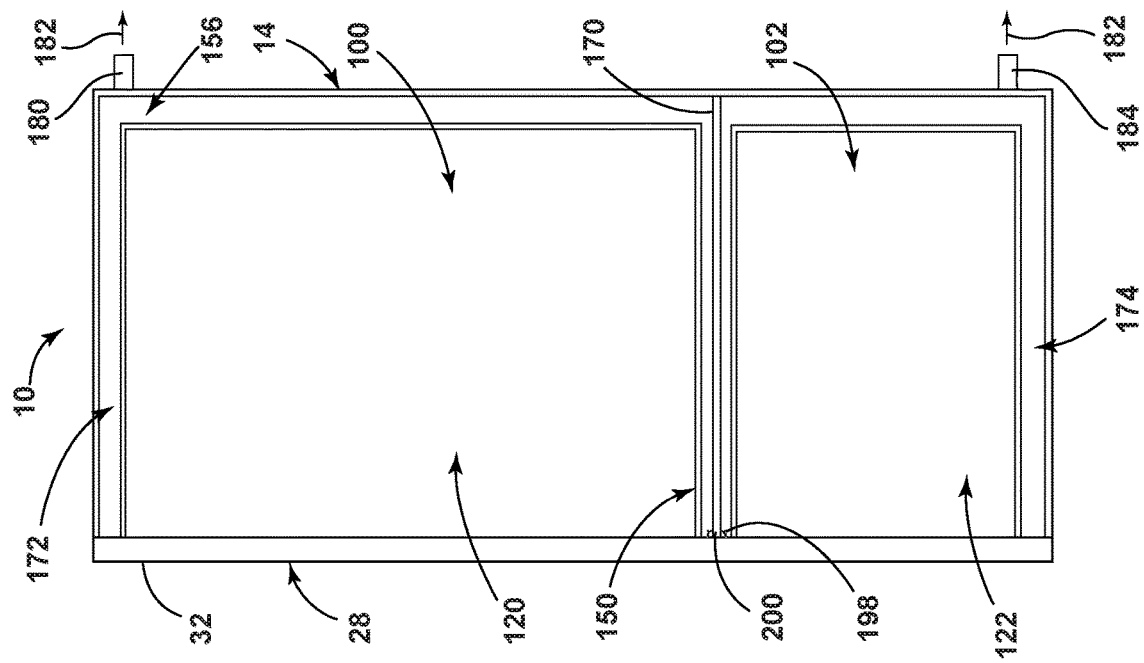
FIG. 14 is a cross-sectional view of a structural cabinet incorporating an aspect of the cavity partition.
Figure 13:
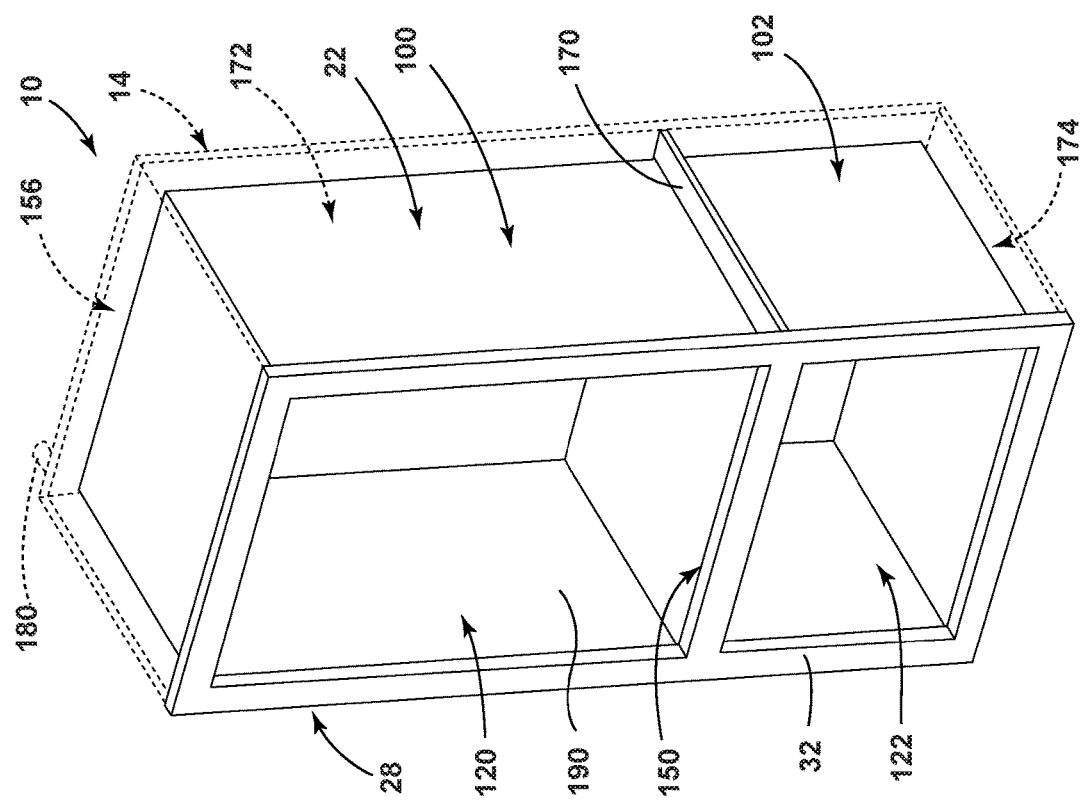
FIG. 13 is a perspective view of a structural cabinet incorporating a cavity partition for separating the interior cavity into distinct interior cavity portions.
Figure 15:
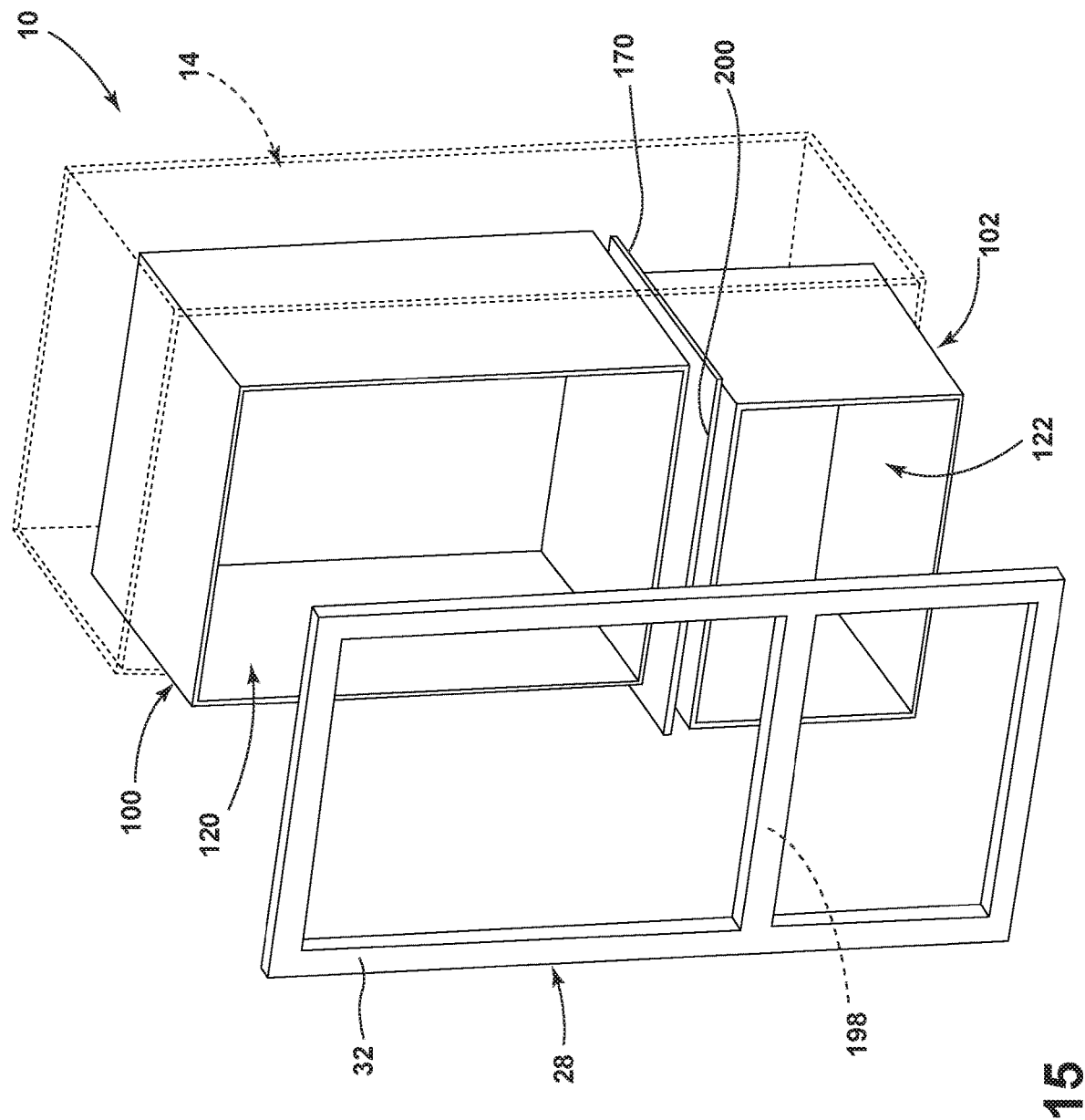
FIG. 15 is an exploded perspective view of the structural cabinet of FIG. 13.
Figure 16:
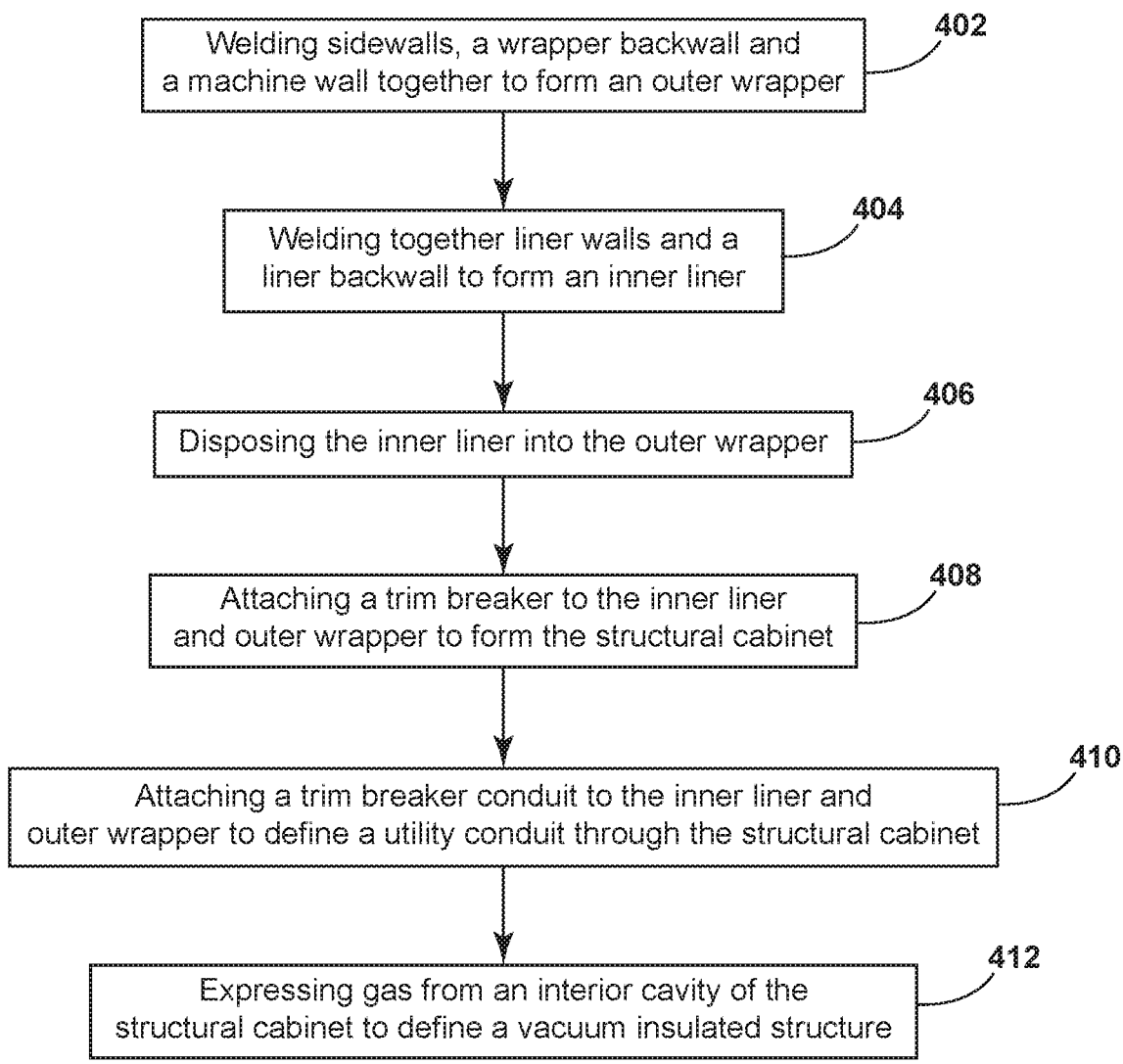
FIG. 16 is a linear flow diagram illustrating a method for forming an appliance cabinet.
Figure 17:
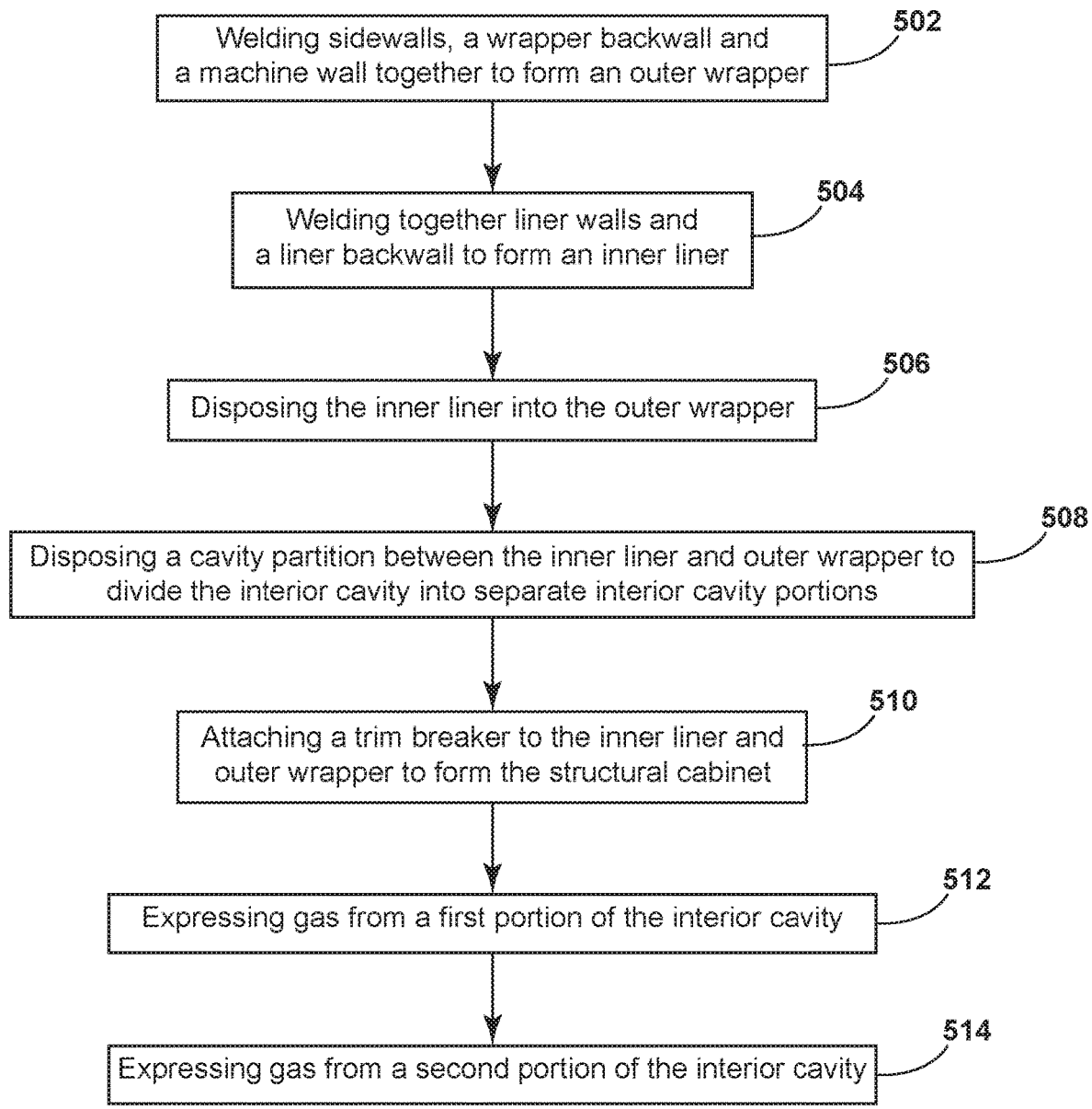
FIG. 17 is a linear flow diagram illustrating a method for forming an appliance cabinet.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-12, reference numeral 10 generally refers to a structural cabinet for an appliance 12. Such appliances 12 can include, but are not limited to, refrigerators, freezers, coolers, pantries, combinations thereof, ovens, laundry appliances, dishwashers, water heaters, and other similar appliances 12 found within residential and commercial settings. According to the various embodiments, the appliance 12 can include a metallic outer wrapper 14 having sidewalls 16, a wrapper backwall 18, and a machine wall 20. At least one metallic inner liner 22 is also included. The at least one metallic inner liner 22 includes liner walls 24 and a liner backwall 26. It is contemplated that the metallic outer wrapper 14 and the at least one metallic inner liner 22 can be coupled together at a trim breaker 28 to define the structural cabinet 10 having a hermetically sealed interior cavity 30 that is defined between the metallic outer wrapper 14 and the one or more metallic inner liners 22. It is further contemplated that the trim breaker 28 can be positioned to define a front face 32 of the structural cabinet 10. At least one trim breaker conduit 34 is positioned to extend through the outer wrapper 14 and inner liner 22, such as the wrapper and liner backwalls 18, 26. In such an embodiment, the trim breaker conduit 34 defines a utility conduit 36 through the structural cabinet 10. The trim breaker conduit 34 can be attached to the wrapper and liner backwalls 18, 26 such that the structural cabinet 10 remains hermetically sealed at the trim breaker conduit 34 and at the trim breaker 28.

Referring again to FIGS. 1-12, the trim breaker conduit 34 defines a sealed grommet-type opening that extends through the structural cabinet 10 to allow for various utilities 50 to be run through the structural cabinet 10 from a machine compartment 52 of the appliance 12. It is contemplated that the machine compartment 52 can be disposed proximate the machine wall 20 of the metallic outer wrapper 14. Wiring, piping, tubing, ductwork, and other utilities 50 are adapted to be run from the machine compartment 52 and through the trim breaker conduits 34 for providing paths within the utility conduits 36 through which these utilities 50 can be run within the appliance 12. By incorporating the trim breaker conduits 34 within the structural cabinet 10, openings, punctures, and other openings within the structural cabinet 10 can be kept to a minimum. Additionally, these utility conduits 36 within the structural cabinet 10 can be located at the trim breaker conduits 34, such that an at least partial vacuum can be maintained within the interior cavity 30 of the structural cabinet 10.

According to the various embodiments, it is contemplated that an insulating material 60 can be disposed within the hermetically sealed interior cavity 30. Additionally, the hermetically sealed interior cavity 30 can be placed under an at least partial vacuum to define a vacuum insulated structure of the structural cabinet 10. By incorporating the various trim breaker conduits 34, the at least partial vacuum can be maintained within the interior cavity 30, while also allowing for the placement of utilities 50 through the utility conduits 36 within the appliance 12 and through the structural cabinet 10.

Referring again to FIGS. 1-12, it is contemplated that each trim breaker conduit 34 can include a wrapper conduit channel 70 that receives a wrapper edge 72 proximate a wrapper aperture 74 of the outer wrapper 14. Each trim breaker conduit 34 can also include a liner conduit channel 76 that receives a liner edge 78 proximate a liner aperture 80 within the inner liner 22. The trim breaker conduit 34 can also include a conduit wall 82 that extends between the wrapper and liner conduit channels 70, 76. It is contemplated that the inner surface 84 of the conduit wall 82 defines the space of the utility conduit 36 through the structural cabinet 10 that allows for passage of the utilities 50 within the appliance 12. The outer surface 86 of the conduit wall 82 serves to define a portion of the hermetically sealed interior cavity 30.

Referring again to FIGS. 1-12, it is contemplated that the structural cabinet 10 can include first and second inner liners 100, 102. Each of the first and second inner liners 100, 102 can include corresponding first and second trim breaker conduits 104, 106. It is contemplated that the first trim breaker conduit 104 defines a first utility conduit 108 through the structural cabinet 10 at the first inner liner 100. The second trim breaker conduit 106 defines a second utility conduit 110 through the structural cabinet 10 at the second inner liner 102. It is contemplated that the structural cabinet 10 can include the first and second trim breaker conduits 104, 106 and can also include additional trim breaker conduits 34. Typically, a single trim breaker conduit 34 will be disposed within the structural cabinet 10 at or proximate each interior compartment 112 that typically corresponds to a separate dedicated inner liner 22.

As exemplified in FIGS. 2-9, a first inner liner 100 corresponds to a refrigerating compartment 120 and a second inner liner 102 corresponds to a freezing compartment 122. Typically, the conduit wall 82 for each of the trim breaker conduits 34 is adapted to extend perpendicularly between the wrapper and liner conduit channels 70, 76 of each trim breaker conduit 34. In this manner, the conduit is adapted to define a grommet that extends perpendicularly through the structural cabinet 10. It is also contemplated that various aspects of the trim breaker conduit 34 can extend at an angle through the structural cabinet 10 where such angle is useful to define a more convenient path through the structural cabinet 10 for delivering various utilities 50 to certain areas of the appliance 12.

Referring again to FIGS. 1-12, it is contemplated that the sidewalls 16, the wrapper backwall 18 and the machine wall 20 of the outer wrapper 14 are each metallic members that are welded together to define the metallic outer wrapper 14 as a single unitary piece. Similarly, the liner walls 24 and liner backwall 26 of each of the inner liners 22 can also be metallic members that are welded together. In this manner, each inner liner 22 defines a metallic inner liner 22 as a single unitary piece. Accordingly, the outer wrapper 14 defines an outside box that is formed through the welded engagement of three metallic components: the sidewalls 16, the wrapper backwall 18 and the machine wall 20.

Referring again to FIGS. 2, 3 and 9, it is contemplated that the sidewall 16 of the outer wrapper 14 is a metallic part that can be bent into a rectangular shape and welded at side joints 130. The wrapper backwall 18 is a metallic sheet that is formed with a backwall edge 132 that engages the sidewalls 16. The wrapper backwall 18 can include a machine aperture 134 through which the machine wall 20 can be placed and welded to the wrapper backwall 18. It is contemplated that the wrapper apertures 74 that receive the wrapper conduit channel 70 can be disposed in various portions of the outer wrapper 14. Typically, the wrapper conduit aperture will be disposed within the machine wall 20 and/or the wrapper backwall 18.

Referring again to FIGS. 2, 4, 5 and 9, the metallic inner liners 22 are formed in a similar fashion to that of the outer wrapper 14. Each of the inner liners 22 can include the liner walls 24 that form a substantially perimetrical shape that is welded to the liner backwall 26. It is contemplated that the liner backwall 26 can include a planar member or a member that is contoured to match the general shape of certain portions of the appliance 12. By way of example, and not limitation, the liner backwall 26 of the second inner liner 102 can be shaped to match the contour of the machine wall 20 of the outer wrapper 14. In this manner, the machine compartment 52 can be positioned behind the freezing compartment 122 of the structural cabinet 10 while the second inner liner 102 and outer wrapper 14 can also define a portion of the interior cavity 30 that extends around the machine compartment 52 and also provides insulating functions around the machine compartment 52.

Referring again to FIGS. 1-12, the outer wrapper 14 and inner liners 22 are attached together by placing the various inner liners 22 within the outer wrapper 14. The trim breaker 28 includes a wrapper channel 140 that engages a wrapper edge 72 of the outer wrapper 14. The trim breaker 28 also includes a liner channel 142 that receives a liner edge 78 of each of the inner liners 22. It is contemplated that the trim breaker 28 can attach to the outer wrapper 14 and inner liners 22 through an adhesive, or can be attached through various welding and/or mechanical attachment processes, or combinations of adhesive, welding and/or mechanical attachment.

Referring again to FIGS. 1-12, it is contemplated that where the first and second inner liners 100, 102 come together, an interior mullion 150 extends between the first and second inner liners 100, 102. A portion of the trim breaker 28 can be integral to extend across the interior mullion 150. In this manner, the trim breaker 28 defines the front face 32 of the structural cabinet 10. The trim breaker 28 can also include various utility features proximate the front face 32 such as a heat loop 152, structural attachment points for hinges 154, and an interior insulating space 156 that receives at least a portion of the insulating material 60. It is contemplated that the trim breaker 28 can at least partially define the hermetically sealed interior cavity 30 of the structural cabinet 10. To achieve the at least partial vacuum within the interior cavity 30, it is contemplated that a hermetic seal can be defined between the trim breaker 28, the outer wrapper 14 and the various inner liners 22 of the appliance 12. To further define this hermetic seal, it is contemplated that the trim breaker 28 and the trim breaker conduits 34 of the structural cabinet 10 can be made of metal, plastic, various polymers, composite materials, combinations thereof, and other similar materials that can be formed to create a hermetic seal within the interior cavity 30 of the structural cabinet 10.

Referring now to FIGS. 1-15, it is contemplated that the appliance 12 can include the metallic outer wrapper 14 having sidewalls 16, the wrapper backwall 18 and the machine wall 20 that are welded together to define the unitary metallic outer wrapper 14. One or more metallic inner liners 22 can also be included, where each metallic inner liner 22 includes liner walls 24 and a liner backwall 26 that are welded together to define unitary metallic inner liners 22 that are disposed within the metallic outer wrapper 14. It is contemplated that the metallic outer wrapper 14 and the various metallic inner liners 22 are coupled together to define the structural cabinet 10 that includes the hermetically sealed interior cavity 30 defined between the metallic outer wrapper 14 and the various metallic inner liners 22. As discussed above, the trim breaker 28 typically defines a front face 32 of the structural cabinet 10. A cavity partition 170 is disposed within the interior cavity 30. The cavity partition 170 is adapted to separate the interior cavity 30 into separate and distinct first and second portions 172, 174 of the interior cavity 30. It is contemplated that the cavity partition 170 maintains the first portion 172 of the interior cavity 30 hermetically sealed and separate from the second portion 174 of the interior cavity 30.

According to the various embodiments, by separating the first and second portions 172, 174 of the interior cavity 30 through use of the cavity partition 170, each of the first and second portions 172, 174 can be maintained as a separate vacuum insulated structure. Accordingly, damage to one of the first and second portions 172, 174 that may result in loss of vacuum within that portion will not affect the at least partial vacuum within the other of the first and second portions 172, 174 of the interior cavity 30. During formation of the structural cabinet 10, it is contemplated that the first portion 172 of the interior cavity 30 can be placed in communication with a first gas outlet 180 for expressing gas 182 from the first portion 172. Similarly, the second portion 174 of the interior cavity 30 is placed in communication with a second gas outlet 184 for separately expressing gas 182 from the second portion 174 of the interior cavity 30. In this manner, different air pressures can be defined within each of the first and second portions 172, 174 of the interior cavity 30.

Referring again to FIGS. 1-15, where the structural cabinet 10 includes first and second inner liners 100, 102, it is contemplated that the cavity partition 170 can extend between the first and second inner liners 100, 102. In this manner, the first inner liner 100 can partially define the first portion 172 of the interior cavity 30, but not the second portion 174. Conversely, the second inner liner 102 can partially define the second portion 174 of the interior cavity 30, but not the first portion 172. In such an embodiment, the cavity partition 170 can extend from one sidewall 16 of the outer wrapper 14 to the other sidewall 16 of the outer wrapper 14 and defines surfaces of each of the first and second portions 172, 174. The cavity partition 170 extends between the inner liner 22 and the outer wrapper 14 and engages a portion of the trim breaker 28 proximate the interior mullion 150. Accordingly, the cavity partition 170 and the interior mullion 150 serves to define a boundary and/or dividing point between the first and second portions 172, 174 of the interior cavity 30. It is also contemplated that the cavity partition 170 can be contained within a wall 190 of the structural cabinet 10 and can extend between an inner liner 22 of the structural cabinet 10 and the outer wrapper 14 of the structural cabinet 10. In such an embodiment, a cavity partition 170 is a generally U-shaped member that extends through the wall 190 of the structural cabinet 10. It is contemplated that a plurality of cavity partitions 170 can be included within the structural cabinet 10. In this manner, the interior cavity 30 can be separated into a plurality of interior cavity portions 192 that are each hermetically sealed from one another. Accordingly, loss of vacuum within any one of the interior cavity portions 192 of the insulating cavity may not result in a loss of vacuum within other interior cavity portions 192 of the interior cavity 30.

Through the use of the one or more cavity partitions 170 within the structural cabinet 10, it is contemplated that service calls can be made with respect to one or more interior cavity portions 192 of the insulating cavity. While waiting for such service call, the insulating capabilities of the other interior cavity portions 192 of the insulating cavity may be unaffected as the at least partial vacuum within these other portions can be maintained even though one of the other interior portions of the interior cavity 30 may be damaged. It is contemplated that pressure sensors can be disposed within the various interior cavity portions 192 of the interior cavity 30 to monitor the level of vacuum pressure within each interior cavity portion 192 of the interior cavity 30. A loss of pressure in any one interior cavity portion 192 can be communicated to the user or to a service center to alert that a service call may be needed.

According to the various embodiments, the cavity partition 170 can be made of any one of various materials that can include, but is not limited to, metals, plastics, polymers, composite materials, combinations thereof, and other similar materials that can maintain the various interior cavity portions 192 of the interior cavity 30 hermetically sealed and separate from one another.

According to the various embodiments, it is contemplated that the interior mullion 150 can include a partition channel 198 proximate the wrapper channel 140 and liner channel 142 that receives a partition edge 200 of the cavity partition 170. In this manner, the cavity partition 170 can also engage a portion of the trim breaker 28 to define the hermetically separated first and second portions 172, 174 of the interior cavity 30 of the structural cabinet 10.

Referring now to FIGS. 1-16, having described various aspects of the structural cabinet 10, a method 400 is disclosed for forming a structural cabinet 10 for an appliance 12. According to the method 400, the outer wrapper 14 is formed by welding the sidewalls 16, the wrapper backwall 18 and the machine wall 20 together to define the metallic outer wrapper 14 (step 402). At least one wrapper aperture 74 can be defined within the metallic outer wrapper 14. The liner sidewalls 16 and liner backwall 26 can also be welded together to define one or more metallic inner liners 22 (step 404). A liner conduit aperture can also be defined within at least one of the metallic inner liners 22. Typically, each metallic inner liner 22 will include a dedicated liner aperture 80 for receiving a trim breaker conduit 34 to define a conduit through the structural cabinet 10. The metallic inner liner 22 is then disposed into the metallic outer wrapper 14 (step 406). The inner liner 22 and outer wrapper 14 are aligned, such that the wrapper aperture 74 is disposed in alignment with the liner aperture 80 for proper disposition of the trim breaker conduit 34 within the wrapper and liner apertures 74, 80. The trim breaker 28 is then attached to the liner edge 78 of the inner liner 22 and the wrapper edge 72 of the outer wrapper 14 to define the structural cabinet 10 with the interior cavity 30 defined therebetween (step 408). The trim breaker conduit 34 is also attached to the wrapper and liner apertures 74, 80 to define a utility conduit 36 extending through the structural cabinet 10 (step 410). As discussed above, the trim breaker 28 and the trim breaker conduit 34 can be hermetically sealed to the inner liner 22 and outer wrapper 14 to define the hermetically sealed interior cavity 30. Once the hermetic seal is formed, gas 182 can be expressed, expelled, or otherwise removed from the interior cavity 30 to define a vacuum insulated structure of the structural cabinet 10 (step 412). In this manner, an at least partial vacuum is defined within the interior cavity 30.

Referring again to FIGS. 1-16, it is contemplated that the step 406 of disposing the metallic inner liner 22 into the metallic outer wrapper 14 can also include disposing the cavity partition 170 between the inner liner 22 and the outer wrapper 14. As discussed above, the cavity partition 170 can be adapted to separate the interior cavity 30 into first and second portions 172, 174 of the interior cavity 30. These first and second portions 172, 174 of the interior cavity 30 can be maintained hermetically separate from one another such that separate vacuums and potentially different vacuum pressures can be defined within each of the first and second portions 172, 174, and additional portions, of the interior cavity 30. It is further contemplated that the step 412 of expressing, expelling or otherwise removing gas 182 from the interior cavity 30 can include expressing gas 182 from the first portion 172 of the interior cavity 30 via the first gas outlet 180 and separately removing gas 182 from the second portion 174 of the interior cavity 30 via the second gas outlet 184.

Referring now to FIGS. 1-15 and 17, a method 500 is disclosed for forming a structural cabinet 10 for an appliance 12. According to the method 500, sidewalls 16, a wrapper backwall 18 and a machine wall 20 are welded together to define the metallic outer wrapper 14 (step 502). Liner sidewalls 16 and a liner backwall 26 are also welded together to define a metallic inner liner 22 (step 504). As discussed above, one or more inner liners 22 can be formed, depending on the number of interior compartments 112 that are included within the structural cabinet 10. According to the method 500, the metallic inner liner 22 is disposed into the metallic outer wrapper 14 (step 506). The cavity partition 170 can be disposed between the inner liner 22 and the outer wrapper 14 (step 508). It is also contemplated that the cavity partition 170 can be disposed between separate inner liners 22, such as through an interior mullion 150 of the structural cabinet 10. According to the method 500, the trim breaker 28 is attached to a liner edge 78 of the inner liner 22 and a wrapper edge 72 of the outer wrapper 14 to define the structural cabinet 10 with an interior cavity 30 defined therebetween (step 510). Through forming the structural cabinet 10, the cavity partition 170 separates the interior cavity 30 into first and second portions 172, 174 of the interior cavity 30. After forming the structural cabinet 10, gas 182 can be expressed from the first portion 172 of the interior cavity 30 (step 512) and gas 182 can also be separately expressed from the second portion 174 of the interior cavity 30 (step 514).

Referring again to FIGS. 1-17, in each of the embodiments of the structural cabinet 10 that may or may not include an aspect of the cavity partition 170, the wrapper and liner apertures 74, 80, such as conduit apertures, can be formed within the outer wrapper 14 and one or more inner liner 22, respectively. The use of the trim breaker conduit 34 attached to the wrapper and liner apertures 74, 80 defines the utility conduit 36 extending through the structural cabinet 10 for allowing various utilities 50 to pass through the structural cabinet 10 without puncturing or otherwise damaging the at least partial vacuum within the interior cavities 30 and hermetically separate portions of the interior cavity 30.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A structural cabinet for an appliance, the structural cabinet comprising:
   a metallic outer wrapper having sidewalls, a wrapper backwall and a machine wall;
   at least one metallic inner liner having liner walls and a liner backwall, wherein the metallic outer wrapper and the at least one metallic inner liner are coupled together at a trim breaker to define an interior cavity defined between the trim breaker, the metallic outer wrapper and the at least one metallic inner liner, the trim breaker defining a front face of the structural cabinet; and
   at least one trim breaker conduit that extends through the wrapper and liner backwalls wherein the at least one trim breaker conduit defines a conduit through the structural cabinet, wherein the interior cavity is hermetically sealed at the at least one trim breaker conduit, wherein the at least one trim breaker conduit includes a wrapper conduit channel that receives a wrapper edge proximate a wrapper aperture and a liner conduit channel that receives a liner edge proximate a liner aperture, wherein the wrapper edge at the wrapper conduit channel is perpendicular to the wrapper backwall and wherein the liner edge at the liner conduit channel is parallel with the wrapper edge at the wrapper conduit channel.

2. The structural cabinet of claim 1, wherein the at least one trim breaker conduit includes a conduit wall that extends between the wrapper and liner conduit channels, an inner surface of the conduit wall defining the conduit through the structural cabinet, and an outer surface of the conduit wall defining a portion of the interior cavity.

3. The structural cabinet of claim 1, wherein the at least one metallic inner liner includes first and second inner liners, and wherein the at least one trim breaker conduit includes first and second trim breaker conduits, the first trim breaker conduit defining a first utility conduit through the structural cabinet at the first inner liner and the second trim breaker conduit defining a second utility conduit through the structural cabinet at the second inner liner.

4. The structural cabinet of claim 1, wherein the sidewalls, the wrapper backwall and the machine wall of the metallic outer wrapper are welded together to define the metallic outer wrapper as a single unitary piece.

5. The structural cabinet of claim 1, wherein the at least one metallic inner liner includes first and second inner liners, wherein the liner walls and liner a backwall of each metallic inner liner are metallic members that are welded together to define each metallic inner liner as a single unitary piece.

6. The structural cabinet of claim 2, wherein the conduit wall extends perpendicularly between the wrapper and the liner conduit channels.

7. The structural cabinet of claim 1, wherein the at least one trim breaker conduit is attached to the at least one metallic inner liner and the metallic outer wrapper by an adhesive.

8. The structural cabinet of claim 1, wherein the trim breaker and the at least one trim breaker conduit are plastic members.

9. The structural cabinet of claim 2, wherein a cross section of the at leaest one trim breaker conduit taken at the conduit wall defines a generally oblong shape.

10. A structural cabinet for an appliance, the structural cabinet comprising:
    a metallic outer wrapper having sidewalls, a wrapper backwall and a machine wall;

first and second metallic inner liners, each having liner walls and a liner backwall, wherein the metallic outer wrapper and the first and second metallic inner liners are coupled together at a trim breaker to define a hermetically sealed interior cavity defined between the metallic outer wrapper and the first and second metallic inner liners, the trim breaker defining a front face of the structural cabinet;

a cavity partition disposed within the interior cavity, the cavity partition separating the interior cavity into a first portion corresponding to the first metallic inner liner and a second portion corresponding to the second metallic inner liner;

a first trim breaker conduit that extends through the wrapper backwall and the liner backwall of the first metallic inner liner; and a second trim breaker conduit that extends through the wrapper backwall and the liner backwall of the second metallic inner liner, wherein an interior mullion extends between the first and second metallic inner liners and the cavity partition engages a portion of the trim breaker proximate the interior mullion.

11. The structural cabinet of claim 10, wherein the cavity partition maintains the first portion hermetically separate from the second portion.

12. The structural cabinet of claim 10, wherein each trim breaker conduit of the first and second trim breaker conduits includes a wrapper conduit channel that receives a wrapper edge proximate a wrapper aperture and a liner conduit channel that receives a liner edge proximate a liner aperture of the first and second metallic inner liners, respectively.

13. The structural cabinet of claim 10, wherein the sidewalls, the wrapper backwall and the machine wall of the outer wrapper are metallic members that are welded together to define the outer wrapper as a unitary piece, and wherein the liner walls and liner backwall of each of the first and second metallic inner liners are welded together to define each metallic inner liner as a single unitary piece.

14. The structural cabinet of claim 10, wherein the first portion of the interior cavity is in communication with a first gas outlet for expressing gas from the first portion, and wherein the second portion of the interior cavity is in communication with a second gas outlet for expressing gas from the second portion.

15. A method of forming an appliance cabinet, the method comprising steps of:

welding sidewalls, a wrapper backwall and a machine wall together to define a metallic outer wrapper, wherein a wrapper conduit aperture is defined within the metallic outer wrapper;

welding liner walls and a liner backwall together to define a metallic inner liner, wherein a liner conduit aperture is defined within the metallic inner liner;

disposing the metallic inner liner into the metallic outer wrapper and aligning the wrapper conduit aperture with the liner conduit aperture;

attaching a trim breaker to a liner edge of the metallic inner liner and a wrapper edge of the metallic outer wrapper to define a structural cabinet with an interior cavity defined between the metallic inner liner and the metallic outer wrapper;

bending the liner edge at the liner conduit aperture;

bending the wrapper edge at the wrapper conduit aperture;

attaching a trim breaker conduit to the wrapper edge at the wrapper conduit aperture and the liner edge at the liner conduit aperture to define a conduit extending through the structural cabinet, wherein the wrapper edge at the wrapper conduit aperture is perpendicular to the wrapper backwall and wherein the liner edge at the liner conduit aperture is parallel with the wrapper edge at the wrapper conduit aperture; and expressing gas from the interior cavity, wherein an at least partial vacuum is defined therein.

16. The method of claim 15, wherein the step of disposing the metallic inner liner into the metallic outer wrapper includes disposing a cavity partition between the metallic inner liner and the metallic outer wrapper, wherein the cavity partition separates the interior cavity into first and second portions of the interior cavity.

17. The method of claim 16, wherein the step of expressing gas from the interior cavity includes expressing gas from the first portion of the interior cavity via a first gas outlet and separately expressing gas from the second portion via a second gas outlet.

* * * * *